Oct. 1, 1968   J. L. DIVILBISS   3,403,459
TOY MECHANICAL COMPUTER
Filed Sept. 21, 1966   3 Sheets-Sheet 1

INVENTOR
JAMES L. DIVILBISS

BY Woodard, Weikart, Emhardt & Naughton
Attorneys

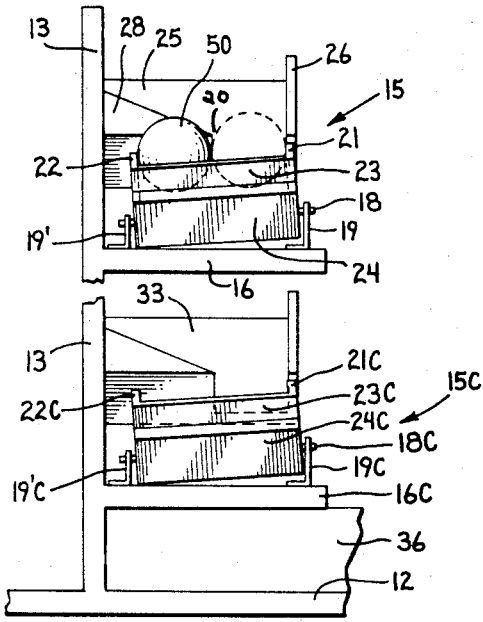
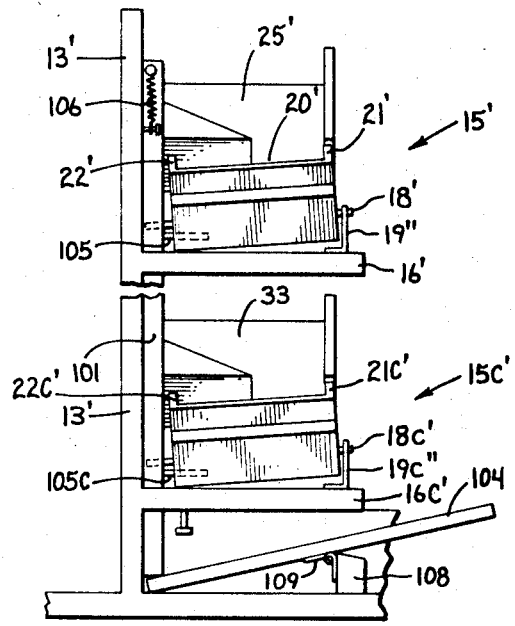
Fig. 2.
Fig. 4.
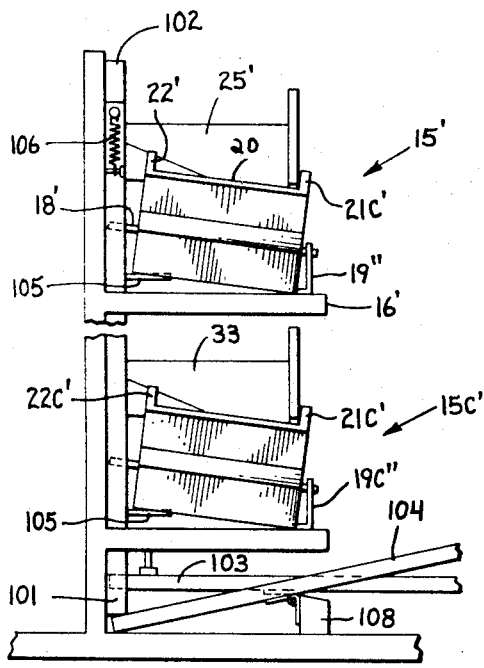
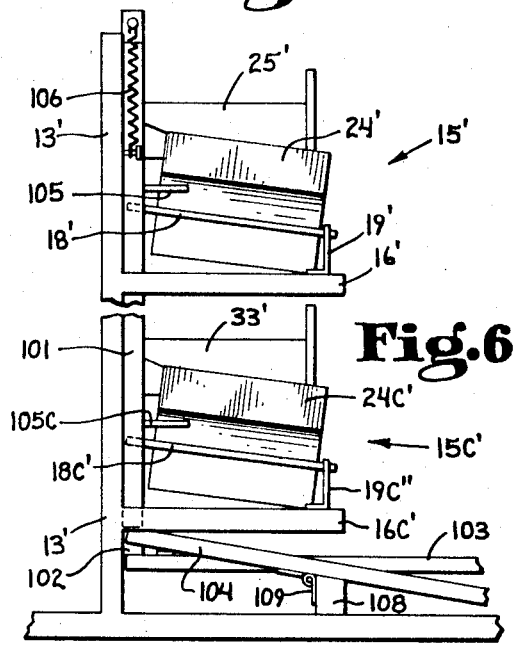
Fig. 5.
Fig. 6.
INVENTOR.
JAMES L. DIVILBISS Oct. 1, 1968  J. L. DIVILBISS  3,403,459
TOY MECHANICAL COMPUTER
Filed Sept. 21, 1966  3 Sheets-Sheet 3

INVENTOR.
JAMES L. DIVILBISS
BY
Woodard, Weikart, Emhardt & Naughton
Attorneys

United States Patent Office 3,403,459
Patented Oct. 1, 1968

3,403,459
TOY MECHANICAL COMPUTER
James L. Divilbiss, Urbana, Ill.
(1912 Robert Drive, Champaign, Ill. 61820)
Filed Sept. 21, 1966, Ser. No. 580,965
7 Claims. (Cl. 35—30)

The present invention relates to a combined toy and educational device which can perform many of the functions of the arithmetic unit of a digital computer. More particularly, the present invention relates to a device for teching the fundamentals of logic and of computations in a number of base systems.

One of the most difficult areas of study for great numbers of students has long been the study of mathematics. Perhaps this difficulty stems from the fact that the fundamental computations of addition, subtraction, multiplication and division may be carried out with practically no knowledge of the underlying theory and principles involved. For years, students have been forced to memorize, not understand.

The recent introduction of the "New Math" into the public schools is an attempt to remedy this situation. Students are being shown that there is nothing sacred about the binary or decimal systems which merely represent engineering convenience and historical convention respectively. They are now being taught to compute in other base systems so that they will understand that the principles of positional notation are independent of the choice of a base.

Educators have long recognized the value of visual aids. Difficult concepts are clarified by devices which reduce the concepts to something simple and concrete. Tutorial aids are even more valuable if the student can operate them. The teaching of chemistry, physics, biology and general science has long been augmented by laboratory experiments carried out by students. The purpose of these experiments is to relate the principles involved to observable physical occurrences.

Advanced technology has also resulted in computers or "electronic brains" which are capable of working out extremely complicated problems in a relatively short time. Problems which formerly required days to solve using hand computation can now be completed in a matter of minutes. One reason for the success of modern computers is the fact that they operate on a radix two or binary base. Each digit of a number expressed in base two is either 0 or 1. In order to better understand the relationship between numbers in the radix ten (decimal) and radix two (binary) systems, examples of corresponding numbers in both systems are given in the following table.

| Decimal: | Binary |
|---|---|
| 0 | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |
| 11 | 1011 |
| 12 | 1100 |

It will be observed from the above table that a given number expressed in the binary system has a larger number of digits than the same number expressed in the decimal system. However, the simplicity of representation of a digital value, and the simplicity of the calculating operations when performed in the binary system compared with those performed in the decimal system result in less expensive equipment and more rapid operation than in the case of calculating equipment wherein the calculations are performed in the decimal system.

Also, as noted above, there are two possible values for any digit of a number expressed in the binary system (or radix two), namely one (1) and zero (0). Accordingly, the value of a digit of a number expresesd in the binary system can be represented by the operated or unoperated condition of a relay, the relay being operated if the value is 1 and unoperated if the value is 0. Binary computers operate on this theory and utilize a series of circuits commonly referred to as "flip-flops." The term "flip-flop" refers to any electrical circuit having two stable states. "Flip-flops" may be realized with electric relays, vacuum tubes, transistors and various other devices.

A toy computer utilizing mechanical "flip-flops" which correspond in function to the electric "flip-flops" of the more complicated "electronic brains" is useful not only in promoting an understanding of mathematical principles but also in promting an understanding of the widely used "electronic brains."

There are several prior art devices which provide a combined toy and educational computer. One such device is disclosed in U.S. Patent No. 3,006,082 issued Oct. 31, 1961, and hereinafter referred to as the Libby patent. While the Libby patent discloses a binary computing machine, it has a number of disadvantages. Libby uitilizes rather complex electrical circuits for interconnecting the "flip-flop" relays to indicating means. This not only increases the cost of his device over a simpler one, but provides a complex mechanism which is susceptible to breaking down, and which is difficult to repair. A second disadvantage is that the Libby device is restricted in its application to the binary system and is limited in its arithmetic function to addition. A further disadvantage is that while the Libby device has one transparent side so that a child can observe the operation of the "flip-flop" relays, the indicator units and pointers are on the opposite side of the device. It is most likely that a child would rely on the indicator units rather than the internal structure to obtain the answers, thus the purpose of the device is, in part, defeated by its very structure.

Therefore, a primary object of the present invention is to provide a novel educational toy computer which can be easily adapted to any number base system.

A further object is to provide an improved device for teaching the addition, subtraction, multiplication and division of numbers expressed in various radix systems which utilizes mechanically operated "flip-flop" relays which correspond in function to the electric relays employed in the more complex "electronic brains."

A still further object of the present invention is to provide a simple yet highly effective device for teaching the principles involved wherein the entire operation is readily visible to the user.

Related objects and advantages will become apparent as the description proceeds.

The full nature of the invention will be understood from the accompanying drawings and the following description of the claims:

FIG. 2 is a fragmentary side elevation taken from the left side of FIG. 1 showing the top relay and the bottom relay;

FIG. 4 is a fragmentary side elevation of FIG. 3 showing the loading or static position of the relays;

FIG. 5 is a fragmentary side elevation of FIG. 3 showing the "tilt" position of the relays; and FIG. 6 is a fragmentary side elevation of FIG. 3 showing the "dump" position of the relays.

Figure 1:
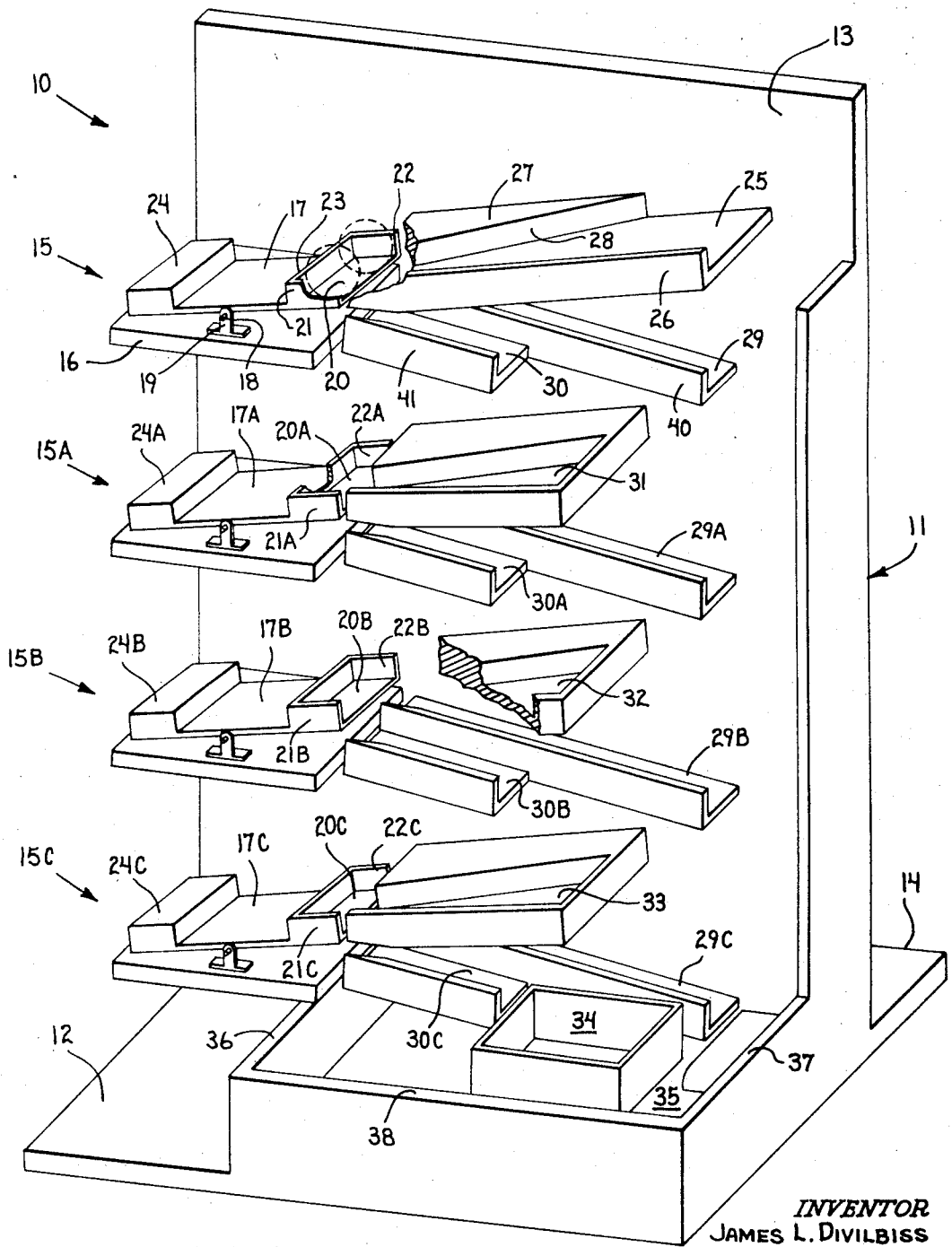
FIG. 1 is a perspective view of one embodiment of a computing device in accord with the present invention.

Referring to the figures, a first embodiment of an educational toy computer is shown generally at 10 of FIGURES 1 and 2. The computer 10 includes a frame shown generally at 11 which has a substantially square base plate 12. A substantially rectangular upstanding mounting wall 13 is affixed to the base plate 12. The mounting wall 13 is the same width as the base plate 12 and is spaced from the back edge 14 of the base plate to balance the computer 10 when it is placed on a flat surface.

Each digital position or order of the computer is represented by a ball actuated, mechanical "flip-flop" relay element shown generally at 15 which corresponds to the more complex electronic "flip-flop" relay elements of an electronic brain. A first relay element 15 represents the units' order. A second relay element 15A spaced below and parallel with relay element 15 represents the two's order. A third relay element 15B spaced below and parallel with relay element 15A represents the four's order. A fourth relay element 15C spaced below and parallel with relay element 15B represents the eight's order, and so forth. It is to be understood that any number of orders may be represented.

Relay elements 15, 15A, 15B and 15C are identical in structure. Therefore, for purposes of description, only relay element 15 will be described in detail. Relay element 15 is pivotally mounted on the upper surface of support plate 16. Support plate 16 is affixed to the front surface of the upstanding mounting wall 13. The support plate 16 is perpendicular to the mounting wall 13 and is parallel with respect to the base plate 12.

A pair of spaced mounting brackets 19 and 19' are affixed to the upper surface of support plate 16. The brackets are apertured to receive the free ends of a rod 18 which is journalled through a substantially rectangular first class lever arm 17. Bracket 19' is shorter than bracket 19 so that lever arm 17 has a predetermined tilt. A receptacle 20 is formed at a first end of the lever arm 17 by side walls 21 and 22 and a rear wall 23. Thus, receptacle 20 has an open end for receiving balls and side and rear walls to confine the balls therein.

A counterweight 24 is affixed to the lever arm 17 at the end opposite from said first end thereof. When the relay element 15 is in its normal or unactivated state, the weight of the counterweight 24 is greater than the weight of the unloaded receptacle 20 and the lever arm 17 is tilted so that the weight is resting on the support plate 16 and the receptacle 20 is tilted upwardly so that the rear wall 23 is lower than the open end.

In this position, the receptacle 20 is aligned with a feed ramp 25 which is affixed to the mounting wall 13. The ramp 25 is downwardly inclined toward the receptacle 20. The ramp has a straight side wall 26 and a side wall 27 which has an inclined inner surface 28 which narrows the path of travel of the ball as it approaches the receptacle and urges the ball so that it enters the receptacle adjacent side wall 21. The ball then rolls to the point adjacent side wall 22 due to the tilt of the receptacle 20. The mass of the weight 24 is greater than the mass of the receptacle plus one ball, thus the lever arm 17 remains in its normal or unactivated position.

Since the heart and soul of all binary computer arithmetic is simply "one plus one equals zero and carry one," the computer 10 would logically be expected to have relays which, upon receiving two balls, would feed one ball to a discard receptacle and carry one to the next digital position or order. Thus, when a second ball is dropped onto ramp 25, the ball rolls to a point adjacent side wall 21 of the receptacle 20. The combined weight of the two balls is greater than the counterbalancing weight 24 and thus the lever arm 17 pivots about rod 18 and the receptacle 20 tips, dumping the ball adjacent side wall 22 onto discard ramp 29 and dumping the ball adjacent side wall 21 onto feed ramp 30 which feeds the ball to input ramp 31 of the second stage or relay element 15A.

The ball rolls down ramp 31 to a point adjacent side wall 21A and then rolls to a point adjacent side wall 22A due to the tilt of receptacle 20A. When two more balls are rolled down ramp 25, one ball will be discarded from ramp 29 and a second ball will drop onto ramp 31 from ramp 30. The combined weight of two balls in receptacle 20A will be greater than the counterbalancing weight 24A, thus receptacle 20A will tip dumping the ball adjacent wall 22A onto discard ramp 29A and dumping the ball adjacent wall 21A onto feed ramp 30A which feeds the ball to input ramp 32 of the third stage. Further operation will cause a ball adjacent wall 22B of receptacle 20B to be dumped onto discard ramp 29B, and a ball adjacent wall 21B of receptacle 20B to be dumped onto ramp 30B and be fed into ramp 33 of the fourth stage, and so forth. Ramp 30C feeds a ball into a rectangular receptacle 34 which is supported on the base plate 12.

The balls discarded from ramps 29, 29A, 29B and 29C are dropped into a receptacle 35 on base plate 12 which is formed by spaced side walls 36 and 37 which are adjacent the front surface of the upstanding mounting wall 13 and an end wall 38 adjacent the front ends of side walls 36 and 37. The discarded balls are available for reuse at any stage of the computing operation.

The discard ramp 29 is affixed to the support wall 13 which forms one side wall for the ramp. The ramp 29 is an angle member so that the second side wall 40 is integrally formed with the ramp. Ramp 30 is affixed to ramp 29 so that the outer surface of side wall 40 acts as a first side wall for ramp 30. Ramp 30 is also an angle member so that the second side wall 41 is integrally formed therewith.

FIG. 2 more clearly illustrates the tilted position of the relay element 15 and hence the receptacle 20. It can be seen that outer bracket 19 is higher than inner bracket 19' so that when a first ball 50 is dropped onto ramp 25, it rolls down the ramp and is directed to the position adjacent side wall 21, as indicated by the ball shown by dotted lines, and then rolls to the position adjacent wall 22.

In the operation of computer 10, a first ball dropped onto ramp 25 rolls to the first position of the receptacle 20 and from there rolls to the second position as shown in FIG. 2. The receptacle remains fixed during this operation. A second ball dropped onto ramp 25 rolls to the first position of the receptacle which is wide enough to receive two balls. The combined weight of the two balls is greater than the counterbalancing weight 24 and thus the receptacle tips, dumping the first ball onto ramp 29 and the second ball onto ramp 30. The ball dumped onto ramp 29 drops to receptacle 35 where it becomes available for reuse. The ball dumped onto ramp 30 falls to ramp 31 where it becomes an input to the second stage or relay element 15A. Receptacle 20A remains fixed.

A third ball dropped onto ramp 25 rolls to the first point of the receptacle 20 and from there rolls to the second point as shown in FIG. 2. A fourth ball dropped onto ramp 25 causes relay element 15 to dump in the same manner as described hereinabove. The "carry" from the unit's stage rolls into the two's stage and causes it to dump. When all of the balls have stopped rolling, there will be a single ball in the four's stage, none in the unit's and none in the two's. It should be recalled that relay element 15B represents the four's stage.

By extension of this procedure, it will be seen that for any number of balls dropped onto ramp 25, the correct binary representation of the number will appear in the receptacles 20, 20A, 20B, 20C and 34. For example, if 13 balls are dropped onto ramp 25, the results will be a ball in receptacle 20C, which is the eight's receptacle, a ball in receptacle 20B, which is the four's receptacle, and a ball in receptacle 20, which is the unit's receptacle. In binary notation, this would be indicated as 1101.

Naturally, the largest number which can be represented in this device depends upon the number of stages or relay elements. Four stages have been shown in the drawings, but actual computers are not limited to this number.

Binary numbers may be added by dropping balls onto ramps 25, 31, 32, etc. in accordance with the binary representation of the number. For example, if nine (9) which has a binary representation of 1001, is to be added to the number already present, it would be done by dropping a ball on ramp 33 and a ball on ramp 25. The order of operation is immaterial.

Subtraction is accomplished by adding the one's complement of the number plus an end correction. This procedure is treated in all elementary computer design texts.

Since this device provides an educational toy, it is important that the operation be conceptually simple and not misleading. Since the basis of all binary computer arithmetic is simply one plus one equal zero and carry one, it can be seen that the present invention provides a device which allows the user to grasp this concept very easily. In fact, the visual operation of this device provides an intuitive explanation of the basic concepts involved.

The present invention can be further adapted to any base. That is, it can be said to have a generality of radix. This simply means that a computer, in accordance with the present invention, can be easily adapted to any number base system. For purposes of discussion, the computer 10 has been shown as a binary computer. However, there is nothing sacred about binary notation, which merely represents engineering convenience. Since children are now being taught to compute in other base systems, it is important that an educational device be adaptable to ternary, quarternary and various other base systems, so that the children will understand that the principles of positional notation are independent of the choice of a base.

Changing the radix of computer 10 is done simply by adjusting the width of the receptacle 20 and the size of the counterweight. For a ternary or a base three computer, the receptacle would be half again as wide and the weight adjusted to dump the three marbles in the tray. Two of the three marbles would be returned to the reservoir and the third marble would act as a carry to the next stage. Thus, an educational toy having interchangeable relay elements which differ by the width of the receptacle 20 is provided so that the student may compute in a number of base systems.

Figure 3:
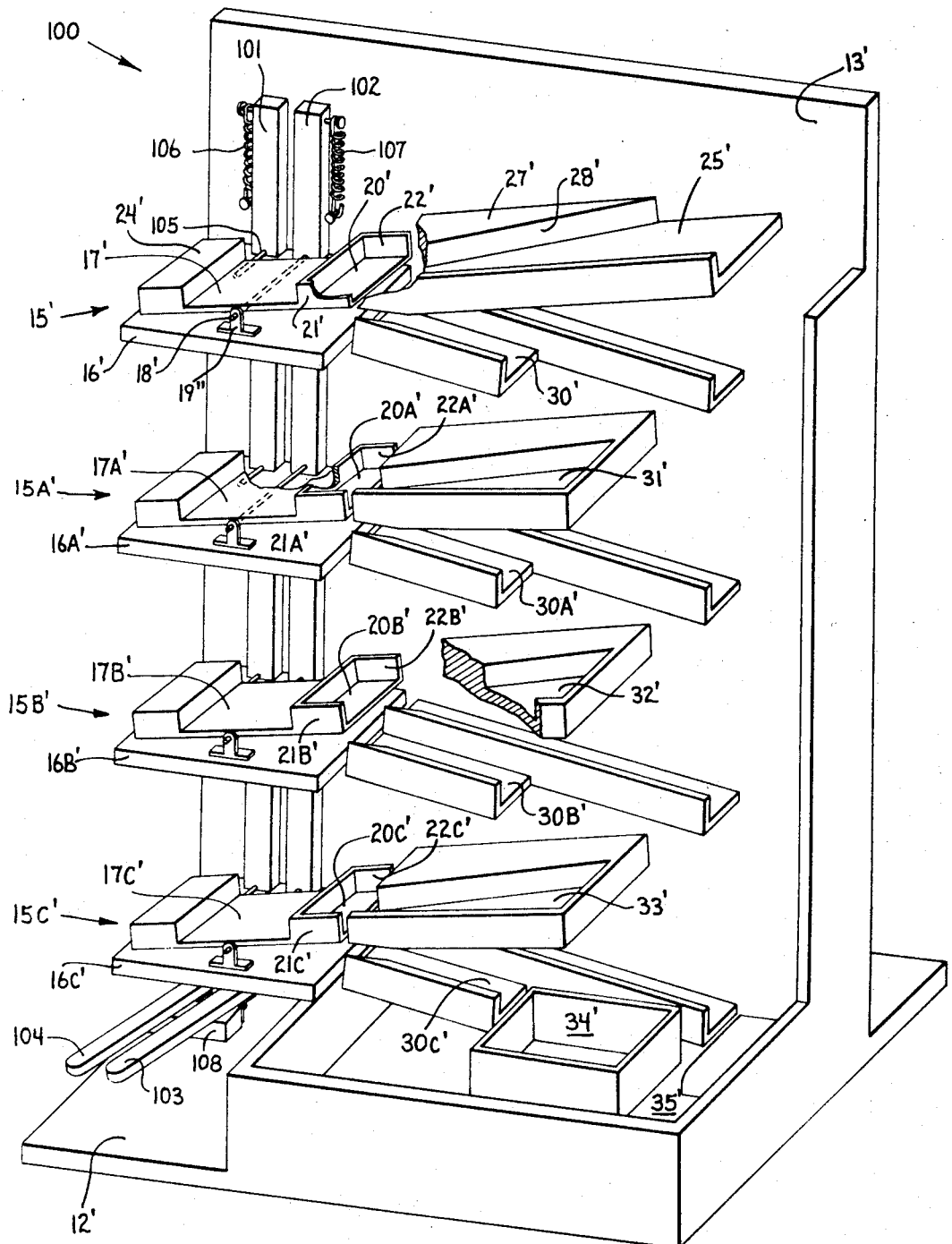
FIG. 3 is a perspective view of a second embodiment of a binary computing device in accord with the present invention.

A generally more complicated embodiment of the present invention is illustrated in FIGS. 3, 4, 5 and 6. In FIG. 3 there is shown a computer which can provide the additional functions of shifting, multiplication and clearing. This is accomplished by additionally providing a dump rod 101 and a tilt rod 102 which are received through support plates 16', 16A', 16B' and 16C'. A pivotally mounted tilt lever 103 is attached to a first end of tilt rod 102 so that the tilt rod may either be raised or lowered by manipulation of the tilt lever 103. Similarly dump lever 104 is affixed to a lower end of dump rod 101 so that the dump rod can be raised or lowered by manipulating the dump lever.

For purposes of description, all elements of similar structure in computers 100 and computer 10 will be designated by the same numeral, but with a prime. Computer 100 differs in structure from computer 10 by the above mentioned dump and tilt rods which are actuated by the above mentioned dump and tilt levers respectively. Thus, it can be seen from the drawing that in computer 100, support plate 16' has only bracket 19" affixed thereto. Instead of rod 18 being received at its opposite end by bracket 19" as shown in FIG. 2 of the drawings, it is received in an aperture in tilt rod 102. As can be seen in FIG. 4, the normal position of element 15' and thus of receptacle 20' is the same as that of computer 10. That is, rod 18' is journalled in tilt rod 102 so that bracket 19" maintains the rod at a higher position than its position in tilt rod 102. Thus computer 100 may be operated just as computer 10 was. That is, when a first ball is dropped onto ramp 25' it will be guided to the position adjacent to side wall 21' and then will roll to the position adjacent side wall 22'.

However, in the operation of computer 100, if only one ball has been fed into receptacle 20' and the operator desires to dump that ball into the second stage or into receptacle 20A', the tilt lever 103 is depressed thereby actuating the tilt rod 102 upwardly, and causing all receptacles 20', 20A', 20B' and 20C' to assume the attitude shown in FIG. 5. That is, to tilt in the opposite direction causing the ball to roll adjacent to side wall 21'. The dump lever 104 is then depressed momentarily and flexible dump fingers 105 will rotate the lever arms 17', 17A', 17B' and 17C' about their pivot rods 18'. Any receptacle holding a ball will dump it into the ramps 30', 30A', 30B' or 30C' where it will serve as a carry or input to the next stage. The tilt lever 103 is then released causing the receptacles to return to their normal state as shown in FIG. 4. This is known as shifting, which is computer parlance for the operation called "moving the decimal point" by people outside the field.

In the above operation, the operator has accomplished a "left shift." Each such operation doubles the contents of the accumulator. This operation is important for two reasons. First, the shift can be used to demonstrate a fundamental principle of positional notation. That is, that shifting one place multiplies or divides by the base. For instance, a binary number shifted one place to the left is multiplied by two. Secondly, shifting is fundamental to all computers for many reasons including the fact that it makes multiplication possible. This is a unique feature in the educational computer art.

To multiply, the operator examines the most significant digit of the multiplier. If the most significant digit is one, the multiplicand is added to the computer 100. If the most significant digit of the multiplier is zero, nothing is done. The above described shifting operation is then carried on once. After shifting, the multiplier is again examined to determine the next most significant digit. If the next most significant digit is one (1), the multiplicand is added. If it is zero, nothing is done. The shifting operation is carried out again. The operator proceeds in this fashion for the remaining digits of the multiplier except for the least significant digit. The least significant digit of the multiplier is examined, and if it is one (1), the multiplicand is added. If zero nothing is done. The product resides in the accumulator or receptacles.

To clear the computer 100, only the dump lever 104 is depressed. This serves to empty all of the receptacles.

The dump rod 101 and the tilt rod 102 have springs 106 and 107 associated therewith to facilitate the return of the rods to the normal position. As can be seen in FIGS. 4, 5 and 6 levers 103 and 104 are pivotally mounted on mounting blocks 108 by a hinge means 109 which allows the levers 103 and 104 to pivot about the block 108. Levers 103 and 104 serve as first class levers which actuate rods 101 and 102 respectively.

While the invention has been illustrated and described in detail in the drawings and foregoing description, the same is to be considered as illustrative and not restrictive in character, but to be understood that only the preferred embodiment has been shown and described and that all changes and modifications that come within the spirit of the invention and the scope of the claims are also desired to be protected.

The invention claimed is:

1. A mechanical computer comprising a support, a lever pivotally mounted on said support and swingable between two positions, said lever being counterweighted to retain said lever in one of said positions, said lever having a receptacle thereon formed to receive a plurality of balls, the weight of said counterweight being sufficiently small in relation to the weight of said plurality of balls, so as to cause said lever to move to the other of said positions when said receptacle has said plurality of balls therein, the weight of said counterweight being sufficiently great in relation to the weight of less balls than said plurality of balls to cause said lever to move to said one position when less than said plurality of balls are in said receptacle.

2. The mechanical computer of claim 1 additionally comprising an input trough, and two output troughs, said input trough being arranged to guide balls into one side of said receptacle, a first of said output troughs being positioned to receive balls from said one side of said receptacle, a second of said output troughs being positioned to receive balls from the other side of said receptacle, said receptacle having a bottom surface which is inclined to guide balls to said other side of said receptacle, said receptacle being formed to retain balls when said lever is in said one position and to discharge balls when said lever is in said other position.

3. Computing apparatus comprising a plurality of the mechanical computers of claim 2 wherein a first of said plurality of mechanical computers has its first output trough arranged to discharge into the input trough of a second of said plurality of mechanical computers.

4. The mechanical computer of claim 2 additionally comprising a frame, said support being fixed to said frame, trunnion means pivotally supporting said lever above said support and centrally of said lever, said lever having a counterweight at one end thereof and having said receptacle at the other end thereof, said lever being in one of said positions when its counterweighted end contacts said support and being in the other of said positions when its receptacle end contacts said support.

5. The invention of claim 3 additionally comprising means for moving said levers from said one position to said other position, and means for changing the incline of the bottom surface of said receptacle to cause the balls to roll to said one side of said receptacle.

6. The invention of claim 5 additionally comprising a frame, said supports being fixed to said frame one above the other in a vertically extending pattern, said means for changing the incline comprising an elongated vertically extending member slidably mounted for vertical movement between said supports and said frame, trunnion means pivotally supporting each of said levers centrally of each lever on said support at one side of each lever and on said member at the other side of said levers, spring means connected between said member and said frame and yieldably holding said member downwardly to yieldably maintain the other side of said levers downwardly and said bottom surfaces inclined to guide balls to said other side of said receptacles, said member being movable upwardly to lift the other sides of said levers to change the incline of said bottom surfaces to cause the balls to roll to the one side of each receptacle.

7. The invention of claim 6 wherein said means for moving the levers from said one position to said other position comprises a further elongated vertically extending member slidably mounted for vertical movement between said supports and said frame, each of said levers having a counterweight at one end thereof and having said receptacles at the other end thereof, a plurality of fingers mounted on said further member and each positioned below a respective counterweighted end of a respective lever, spring means connected between said further member and said frame and yieldably holding said further member downwardly, said further member being movable upwardly to lift the counterweighted end of said levers to move the levers to said one position.

References Cited

UNITED STATES PATENTS

| | | | |
|---|---|---|---|
| 2,522,133 | 9/1950 | Sanders | 273—120 XR |
| 3,006,082 | 10/1961 | Libbey | 35—30 |
| 3,278,187 | 10/1966 | Sinden | 273—118 |
| 3,314,169 | 4/1967 | Wold | 35—32 |

EUGENE R. CAPOZIO, *Primary Examiner.*

W. H. GRIEB, *Assistant Examiner.*